United States Patent
Bakker et al.

(10) Patent No.: US 7,002,957 B2
(45) Date of Patent: Feb. 21, 2006

(54) METHOD OF TRANSPORTING FRAMES OF INFORMATION BETWEEN PARTS OF A NETWORK THROUGH AN INTERMEDIATE NETWORK

(75) Inventors: Roel Den Bakker, Zeewolde (NL);
Peter B. Busschbach, Tinton Falls, NJ (US); Pieter Hulshoff, Almere (NL);
Maarten Petrus Joseph Vissers, Huizen (NL)

(73) Assignee: Lucent Technolgies Inc., Murray Hill, NJ (US)

( * ) Notice: Subject to any disclaimer, the term of this patent is extended or adjusted under 35 U.S.C. 154(b) by 861 days.

(21) Appl. No.: 09/918,385

(22) Filed: Jul. 30, 2001

(65) Prior Publication Data

US 2003/0021270 A1    Jan. 30, 2003

(51) Int. Cl.
*H04L 12/56*       (2006.01)

(52) U.S. Cl. ...................... 370/389; 370/474; 370/465; 370/392

(58) Field of Classification Search ................ 370/389, 370/392, 465, 474

See application file for complete search history.

(56) References Cited

U.S. PATENT DOCUMENTS

2002/0103926 A1 *   8/2002   Cook et al. ................. 709/236
2002/0191691 A1 *  12/2002   Holborow .................... 375/240

FOREIGN PATENT DOCUMENTS

| EP | 1 217 774 A | 6/2002 |
| EP | 1 246 383 A | 10/2002 |
| WO | WO 99 50986 A | 10/1999 |
| WO | WO 00 38362 A | 6/2000 |

\* cited by examiner

*Primary Examiner*—Afsar Qureshi
*Assistant Examiner*—Christopher Grey
(74) *Attorney, Agent, or Firm*—Gregory J. Murgia

(57) ABSTRACT

A method is described for transporting information in frames comprising header and payload information from a first network to a second network via a third network. The first and second networks are commonly managed but are independent of management of the third network. Network nodes generate respective headers for each outgoing frame from the node but completely copies payload from an incoming frame to the outgoing frames. Upon crossing a first boundary between the first and third networks, only a first part of the header is copied into the payload such that a reduced size header in the third network fits into space that would otherwise be occupied by a second part of the header that is not copied into the payload. Upon crossing a second boundary between the third and second networks, the headers are retrieved from the payload and used to generate header information in the second network.

9 Claims, 3 Drawing Sheets

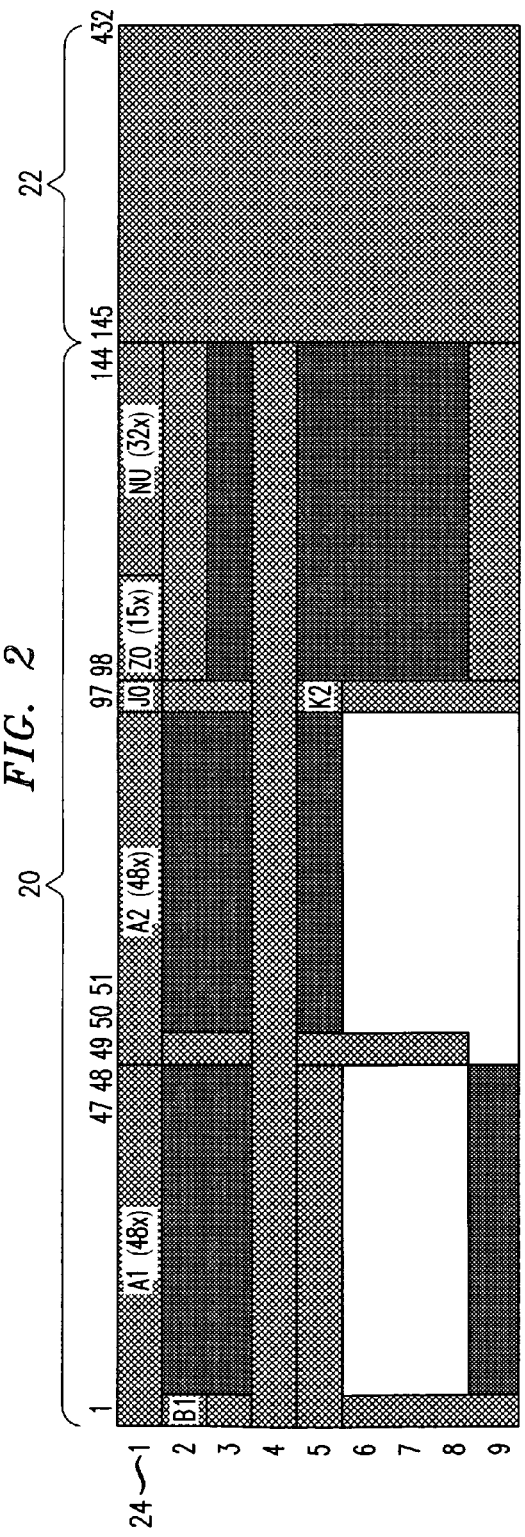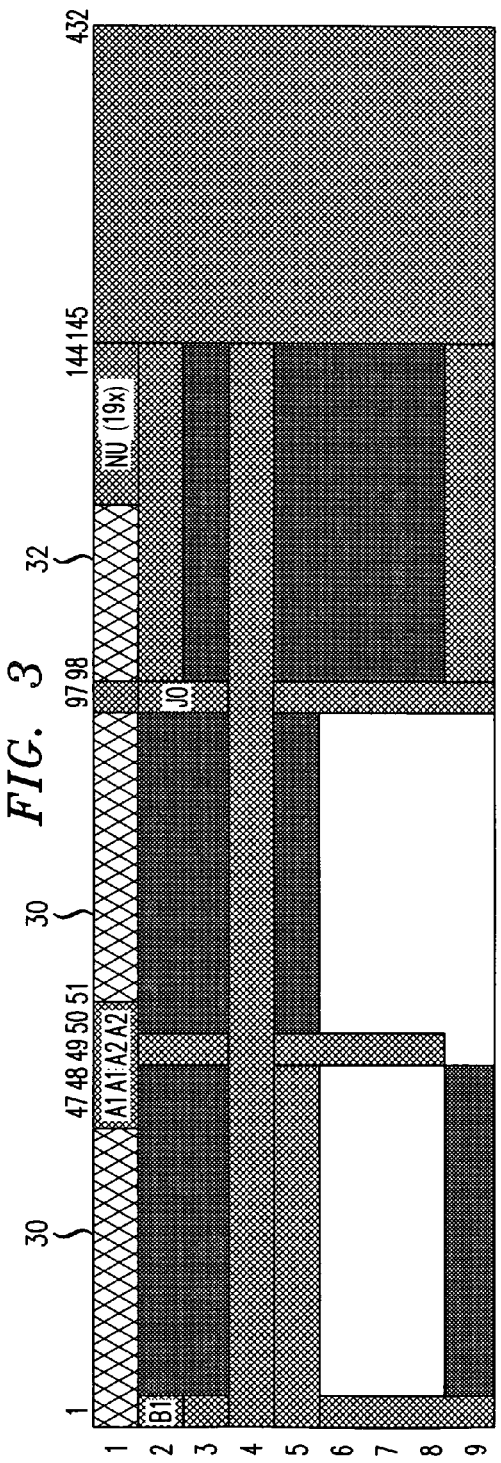

METHOD OF TRANSPORTING FRAMES OF INFORMATION BETWEEN PARTS OF A NETWORK THROUGH AN INTERMEDIATE NETWORK

TECHNICAL FIELD

The invention relates generally to information transport in transmission networks and, more particularly, to transporting information across boundaries between different sub-networks that are not fully synchronous with one another.

BACKGROUND OF THE INVENTION

SDH/SONET transmission equipment is used to transport streams of data in a transmission network. Transport is segmented into frames, which are time segments of transmission, lasting typically 125 microseconds. The SDH/SONET equipment inserts header data, e.g., section overhead (SOH) and so on, as well as payload information in each frame. The payload information in a frame contains data from the stream that is transported, so that payload data from successive frames makes up a continuous stream. By definition, the header data is data that is generated per frame. By way of example, header data includes information such as synchronization data for locating the start of a frame, error detection data for the frame, communication channels between equipment for transporting information such as management and protection coordination information, frame source identification information, national bytes, and so on.

In principle, frames generated at different nodes are asynchronous. That is, their duration may differ slightly and they have no fixed phase relation. Thus, a one-to-one relation does not exist between frames transported in the network or even along a connection via various nodes through the network. Even when two nodes initially start frames at substantially the same time, the start time of a frame having a number n (e.g., a large integer number) of frames after the initial frame in one of the nodes can differ by more than a frame period from the starting time of the frame started n frames after the initial frames in the other node.

This is not a problem for header data because, when the data stream is transported along the connection, nodes generate new headers for their own outgoing frames. Payload data, on the other hand, has to be copied from incoming frames and no data may be lost. Therefore, the nodes have the ability to float the payload data relative to the frames. That is, data starting from a beginning of the payload of an incoming frame does not have to start at a predetermined position in the outgoing frame and the data of the payload in an incoming frame may be distributed over the payloads of successive outgoing frames.

As is well known, header data may be used at a node to manage the transmission network. In principle, a network operator can choose to use any of the bytes from the header in the nodes of the network to manage the network in any particular manner. In practice, however, a network operator may not be able to do this because of the way in which payload data is transported through the network, e.g., if the payload data is transported from a first sub-network of a first operator to a second sub-network of that first operator via a third sub-network of a second operator. Because there need not be a one-to-one correspondence between headers coming out of the last node of the first sub-network (before entering the third sub-network) and headers entering the second sub-network (from the third sub-network), the third sub-network is not transparent to the first operator. Information that is relevant to the first network operator may be lost when the nodes of the third sub-network generate headers as desired by the second operator. The extent to which there is freedom to copy header data from one header to another is often severely limited. For example, consider the situation where a first and second SDH sub-network that carry frames comprising STM-16 signals are connected via an SDH sub-network that carries frames with STM-64 or STM-256 signals. An STM-16 signal has 1152 header bytes, but only about 25 of these bytes are forwarded in the STM-64 or STM-256 signal.

Accordingly, this can obstruct various network management operations of the first network operator. Also timing information, e.g., about the bit rate of the frames, is lost upon passage through the third sub-network. This can also obstruct various network management operations of the first network operator.

A known solution to this problem is to require the third sub-network to use signals with frames of a larger bandwidth, which allows both the header data from the first sub-network and header data generated for the third sub-network to be transported. However, this requires significant overhead, which is typically not feasible or desirable in SDH/SONET-based transmission.

SUMMARY OF THE INVENTION

Timing and synchronization problems associated with transporting information between sub-networks via an intermediate sub-network are solved according to the principles of the invention by transporting header information in the payload section of frames across boundaries between the sub-networks and the intermediate sub-network. Accordingly, the header information from the sub-network passes through the intermediate sub-network without being changed. Because the header information is carried in the payload section, header information is not lost because of asynchronous operation between the networks. Moreover, the third sub-network is effectively transparent to the first and second sub-networks and without requiring larger bandwidth in the third sub-network. For example, information is retained from the header data of the first and second sub-networks upon transport through the third sub-network. Extra bandwidth is not required in the intermediate sub-network because frames transmitted in the intermediate sub-network have reduced-size headers and expanded payload sections.

According to one illustrative embodiment, a method is described for transporting information in frames comprising header and payload information from a first sub-network to a second sub-network via a third sub-network in a transmission network. The first and second sub-networks can be commonly managed but independently of the third sub-network. A node in the transmission network generates respective headers for each outgoing frame, but completely copies payload from an incoming frame to one or more outgoing frames. Upon crossing a first boundary between the first and third sub-networks, only a first part of the header is copied into the payload such that a reduced-size header in the third sub-network fits into space that would otherwise be occupied by a second part of the header that is not copied into the payload in the first sub-network. Upon crossing a second boundary between the third and second sub-networks, the headers are retrieved from the payload and used to generate header information in the second sub-network.

According to another illustrative embodiment, header data and payload information from a plurality of frames carried by a first sub-network are multiplexed into a common frame carried by a third sub-network. Parts of the headers of the plurality of frames are not copied to the payload of the common frame, thus creating additional, unoccupied space. The header of the common frame is maintained at a prescribed and reduced size so that that it does not exceed this unoccupied space. As a result, if N frames are multiplexed into the common frame, the bandwidth used by the common frame does not exceed N times the bandwidth for the individual multiplexed frames. Optionally, synchronization information from incoming headers may not be copied, or is copied only to a limited extent, to the payload, thus creating additional space for the header in the third sub-network.

According to another aspect of the invention, timing information is added to a payload section when crossing a first boundary between the first and third sub-networks. The timing information indicates the extent to which the frame duration (the length of the time interval taken up by a frame) in the first sub-network differs from the frame duration in the third sub-network. Upon crossing a second boundary between the third and second sub-networks, this timing information is then used to regenerate frames in the second sub-network that have substantially the same duration as the frames in the first sub-network. Thus, transport through the third sub-network also becomes transparent with respect to timing.

BRIEF DESCRIPTION OF THE DRAWINGS

A more complete understanding of the present invention may be obtained from consideration of the following detailed description of the invention in conjunction with the drawing, with like elements referenced with like reference numerals, in which:

FIG. 2 shows an exemplary frame format for an STM-16 signal used in Synchronous Digital Hierarchy (SDH)-based transmission;

FIG. 3 shows a modified version of the STM-16 signal from FIG. 2 having reduced overhead according to one illustrative embodiment of the invention.

DETAILED DESCRIPTION

Figure 1:
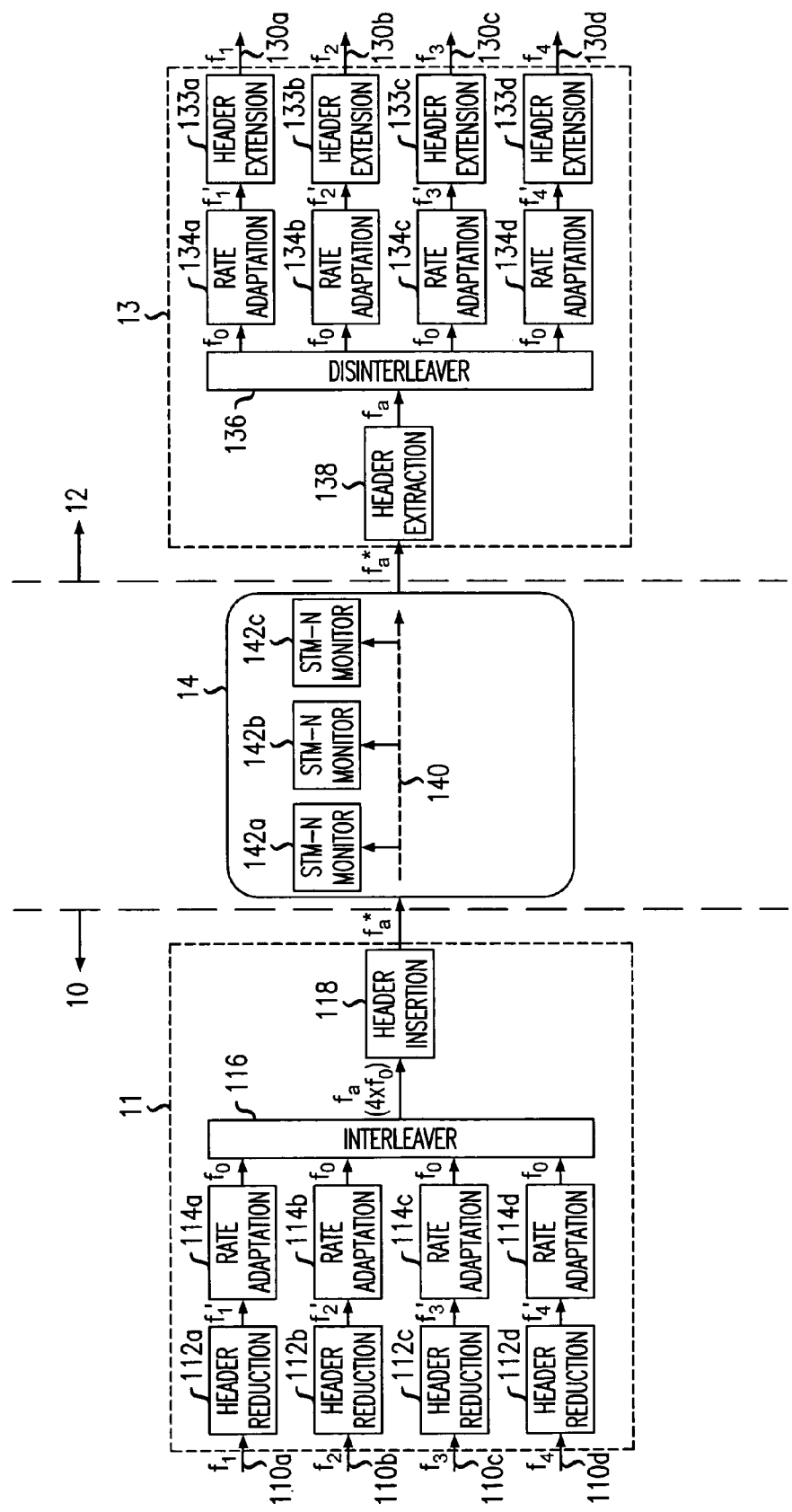
FIG. 1 shows a simplified block diagram of a portion of an exemplary transmission network according to one illustrative embodiment of the invention.

FIG. 1 shows a portion of an exemplary telephone network comprising three sub-networks 10, 12, and 14. More specifically, first sub-network 10 is shown as being coupled to second sub-network 12 via third sub-network 14. In one illustrative embodiment, first and second sub-networks 10 and 12 may belong to a first network operator, e.g., commonly managed, while third sub-network 14 may be separately managed by a second network operator. Of course, this example is meant to be illustrative only and not limiting in any manner since other possible configurations will also be apparent to those skilled in the art and are contemplated by the teachings herein.

As shown, first sub-network 10 includes interface unit 11 for transporting information across the boundary between first sub-network 10 and third sub-network 14. Interface unit 11 has inputs 110a–d for receiving frames, each comprising a header and payload information, from inside first sub-network 10. Interface unit 11 comprises header reduction units 112a–d, rate adaptation units 114a–d, interleaver 116, and header insertion unit 118. Each of inputs 110a–d is coupled to interleaver 116 via a cascade of a respective one of header reduction units 112a–d and a respective one of rate adaptation units 114a–d. Interleaver 116 is coupled to an input of third sub-network 14 via header insertion unit 118.

Third sub-network 14 is not shown in detail. Symbolically, a connection 140 between first and second sub-networks 10 and 12 is shown and a number of frame monitors 142a–c are shown along connection 140.

Second sub-network 12 includes interface unit 13 for transporting information across the boundary between third sub-network 14 and second sub-network 12. Interface unit 13 has outputs 130a–d for transmitting frames into second sub-network 12. Interface unit 13 also includes header extension units 133a–d, rate adaptation units 134a–d, de-interleaver 136, and header extraction unit 138. Third sub-network 14 is coupled to de-interleaver 136 via header extraction unit 138. De-interleaver 136 is coupled to each of outputs 130a–d via a respective cascade of a respective one of rate adaptation units 134a–d and a respective one of header extension units 133a–d.

As stated above, the network shown in FIG. 1 is useful in the case that the same network operator operates first and second sub-networks 10 and 12, but not third sub-network 14 (or at least has no control over transport of header information through third sub-network 14).

FIG. 2 shows an STM-16 signal format to illustrate how information is transported in an incoming frame. It is assumed that those skilled in the art are familiar with the basic STM and STS frame formats set forth in the well-known SDH/SONET standards. As such, details on such formats will not be repeated here for sake of brevity unless helpful to understanding the principles of the invention. Within the STM-16 frame format, information is formatted in a matrix of rows and columns. Successive positions in a row contain information that is transported successively. As is well known, once an entire row has been transported, the next row is transported and so on. The leftmost one hundred forty-four (144) columns of the frame format, shown here as portion 20, include header information, which is normally extracted at a network node. The remaining columns, shown here as portion 22, contain payload information that is typically passed from node to node.

First row 24 of the STM-16 signal contains, within header portion 20, forty-eight (48) A1 bytes, followed by forty-eight (48) A2 bytes, followed by a J0 byte, fifteen (15) Z0 bytes and thirty-two (32) national use (NU) bytes. According to well-known SDH/SONET transmission standards, the contents of the A1 and A2 bytes serve to provide a unique pattern of bytes that can be used to align to the start of a frame. The J0 byte contains a trace identification for identifying the source of the signal transported in the frame. The Z0 bytes are as yet undefined bytes reserved for future international standardization. The national use (NU) bytes allow transport of certain country specific information.

Other bytes shown in the STM-16 signal include, for example, a B1 byte for error detection, a K2 byte containing a standard bit pattern that serves as a message channel indicating whether a fault has been detected upstream in the connection. Additionally, the STM-16 signal contains communication channels for conveying information such as whether equipment in the network has failed, quality of transmission information, and so on.

As shown in FIG. 3, information that is removed from the STM-16 signal is shown by cross-hatching as portions 30 and 32. Referring back to FIG. 1, header reduction units 112*a–d* are used to remove this information from the STM-16 signal. According to one illustrative embodiment, the removed information in portion 30 includes all but the last two (2) of the A1 bytes and the first two (2) of the A2 bytes. However, it should be noted that other A1 and/or A2 bytes might also be retained consistent with the teachings herein. As shown, the Z0 bytes as well as some of the national use (NU) bytes are also removed in portion 32. The remaining bytes that are not removed from the STM-16 signal in FIG. 2 are output from header reduction units 112*a–d* (FIG. 1).

In operation, rate adaptation units 114*a–d* are used to derive signals with the same bit rate (f0) from all of inputs 110*a–d*. In principle, bit rates (f1–f4) of the frames from the various inputs 110*a–d* may differ from the bit rate (f0) used for transmission to third sub-network 14 and possibly from one another depending on the source of the frames. Rate adaptation units 114*a–d* receive the information from the frames at the input bit-rate (f1–f4), buffer the information and output the information at a common bit rate (f0).

In outgoing frames, slightly more space is reserved per frame than is nominally necessary to transport the reduced data for a frame received from header reduction units 112*a–d*. When one or more of the bit rates (f1–f4) are higher than the common bit rate (f0), rate adaptation units 114*a–d* include excess information in the reserved space. In this case, information amounting to slightly more than one incoming frame is transported on average per outgoing frame. Rate adaptation unit 114*a–d* adds information to the outgoing frame indicating that, and the extent to which, this has happened. Thus, the position of the starting point of incoming frames "floats" in the outgoing frame.

Similarly, when one or more of the bit rates (f1–f4) are lower than the common bit rate (f0), rate adaptation units 114*a–d* leave unused space in the outgoing frame. In this case, information amounting to slightly less than one incoming frame is transported on average per outgoing frame. Rate adaptation unit 114*a–d* adds information to the outgoing frame indicating that, and the extent to which, this has happened.

Rate adaptation units 114*a–d* may quantize the excess information and the unused space, by not using excess space or leaving unused until a predetermined threshold, e.g. one byte, of overflow or underflow has been reached.

Interleaver 116 receives the information from the frames plus rate adjustment information from the different inputs and then outputs the information such that successive bytes at the output of interleaver 116 alternately come from different ones of rate adaptation units 114*a–d*. Interleaver 116 outputs the interleaved bytes to header insertion unit 118. Header insertion unit 118 forms, for example, an STM-64 "like" signal by adding a header to the interleaved bytes and scrambling (e.g., channel coding) the bytes following the header.

Figure 4:
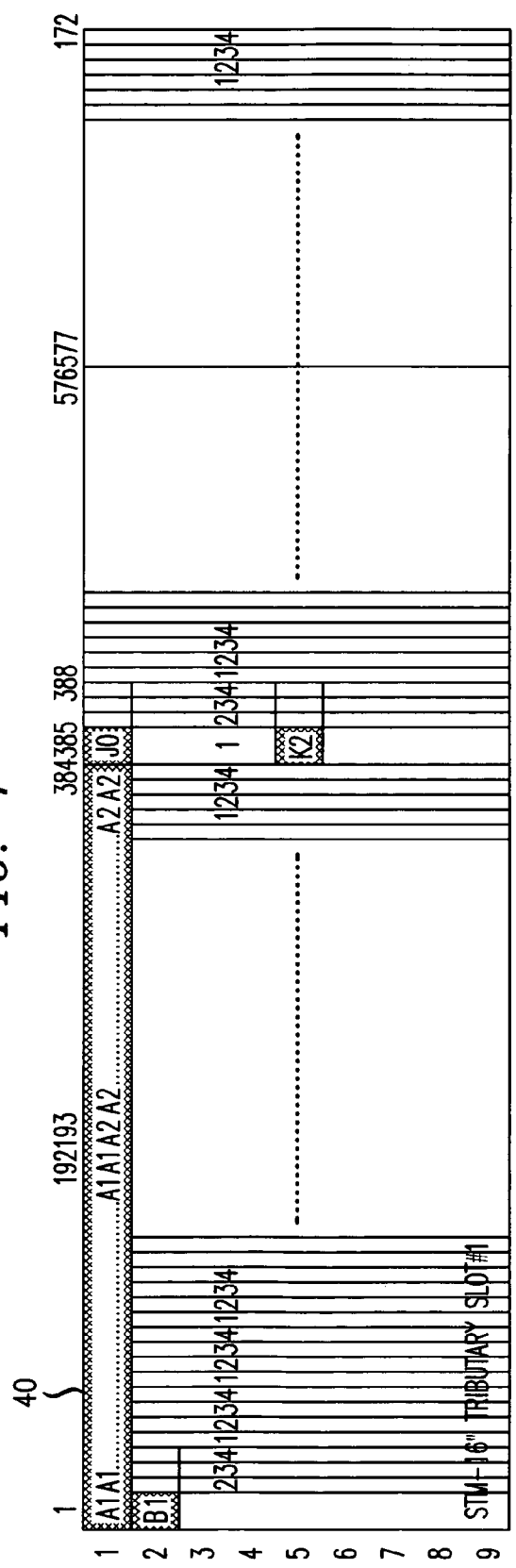
FIG. 4 shows an exemplary frame format for an STM-64 signal used in accordance with one illustrative embodiment of the invention.

FIG. 4 shows an example of an STM-64 "like" signal generated in the manner mentioned above. Header 40 of this signal contains one hundred ninety-two (192) A1 bytes, one hundred ninety-two (192) A2 bytes, a J0 byte, the B1 byte and the K2 byte. Otherwise, the STM-64 "like" signal contains data received from interleaver 116 and some stuffing. It should be noted that the header of this STM-64 "like" signal is smaller than a typical STM-64 header, which would take up a number of full columns. Here, all but the A1, A2, J0, B1 and K2 bytes have been left out. In this manner, space has been made for transmission of both header and payload information from the STM-16 signals received from inputs 110*a–d*. Thus, part of the space in the STM 64 signal that is normally used for header information now can contain payload information, which may be header information and/or payload information from the frames from inputs 110*a–d*. This part of the header space is scrambled (channel coded) together with the remainder of the payload, whereas the remaining part of the part of the header, which is generated in header insertion unit 118, is not scrambled.

This example assumes that third sub-network 14 leaves the part of the signal that no longer contains STM-64 header information intact. This is the case, for example, in a third sub-network 14 that only monitor the signals or that copies header information from the replaced part of the header.

After transmission through third sub-network 14, the signal from header insertion unit 118 is received by interface 13. Interface 13 recovers the original input signals from the signal that has passed through third sub-network 14, including their timing.

Header extraction unit 138 removes the header from the signal that has passed through third sub-network 14, and performs any processing dependent on the content of that header. Subsequently, header extraction unit 138 feeds the information of the signal outside the header to de-interleaver 136. De-interleaver 136 splits this information into a number of subsignals, each corresponding to the information received from a respective one of inputs 110*a–b*.

Rate adaptation units 134*a–d* receive the information at a bit rate determined by the bit rate of the header extraction unit 138 and de-interleaver 136, which is ultimately determined by the bit rate output by rate adaptation units 114*a–d* in interface 11 of first sub-network 10. Rate adaptation units 134*a–d* read the rate adaptation information from this information. Under control of this rate adaptation information, rate adaptation units 134*a–d* reconstitute the incoming frames, gathering payload data and headers from each frame from different frames transmitted via third sub-network 14. The duration of the frame generated by adaptation units 134*a–d* is adapted so that the same amount of information fits in these frames as was included in the original incoming frames received from first sub-network 10 at its boundary with third sub-network 14. This duration is derived by using the information whether excess space had to be used, or space had to be left unused to transport the information of the frame from the first sub-network in the frame received from the third sub-network.

This may be realized by outputting frames at an adapted bit rate, as needed to output data at a rate equal to the incoming bit rate in first sub-network 10, by using the information whether excess space has been used, or space has been left unused to select a correspondingly higher or lower bit rate (f1–f4) for the outputs. In this manner, all used bits transmitted in a frame through third sub-network 14 are, on average, normally output from rate adaptation units 134*a–d* over the duration of that frame. Thus, the payload of an original frame fits into the payload of an output frame. Interface unit 13 preferably places the payload of an original frame into an output frame.

Finally, header extension units 133*a–d* read the header information from the information received from third sub-network 14 and restore the original headers, supplementing any information removed by header reduction units 112*a–d*. Restored frame signals, containing header data, payload and timing substantially as received at inputs 110*a–d* is then transmitted into second sub-network 12. Thus, the first and second sub-networks 10 and 12 can be managed as a single network, even though signals have passed through third sub-network 14.

According to another aspect of the invention, the number of bits or bytes from a frame in first sub-network 10 that is transmitted in a frame in third sub-network 14 is variable, depending on the differences in duration. The timing information is expressed in terms of an indication of the variation in this number. Upon crossing into second sub-network 12, frames are regenerated that contain the same number of bits or bytes as the frames in first sub-network 10. Thus, data copied into a common frame may come from frames that each have their own timing and the timing of each of these frames is restored when the frames are regenerated from the common frame.

The foregoing embodiments are merely illustrative of the principles of the invention. Those skilled in the art will be able to devise numerous arrangements, which, although not explicitly shown or described herein, nevertheless embody those principles that are within the scope of the invention. Accordingly, the embodiments shown and described herein are only meant to be illustrative and not limiting in any manner. The scope of the invention is limited only by the claims appended hereto.

We claim:

1. A method of transporting information from a first sub-network to a second sub-network via a third sub-network in a transmission network, wherein information is transported between nodes in the transmission network in frames, each of the frames including a header and a payload, wherein a node generates a header for each frame transmitted from the node and wherein the node completely copies payload data from an incoming frame to one or more outgoing frames, and wherein the payload data is allowed to float relative to frames, the method comprising:
    copying a first part of a header into payload of a frame upon crossing a first boundary between the first sub-network and the third sub-network such that available space is created in the payload by not copying a second part of the header therein;
    in the third sub-network, using a reduced-size header that fits into the available space in the payload;
    upon crossing a second boundary between the third sub-network and the second sub-network, retrieving the first part of the header and the reduced-size header from the payload and generating header information in the second sub-network;
    adding timing information to the payload when crossing the first boundary, the timing information indicating an extent to which a frame duration in the first sub-network differs from the frame duration in the third sub-network; and
    using the timing information to regenerate frames in the second sub-network upon crossing the second boundary, so that frames in the second sub-network have substantially the same duration as corresponding frames in the first sub-network.

2. The method according to claim 1, wherein headers and payload data from a plurality of frames carried by the first sub-network are multiplexed into a common frame carried by the third sub-network, the common frame carrying an integer multiple of information carried per frame in the first sub-network, wherein unoccupied space remains in the common frame by not copying a second part of the headers from the plurality of frames into payload of the common frame, wherein a header of the common frame is maintained at a prescribed size such that a header of an outgoing frame fits in the unoccupied space.

3. The method according to claim 2, wherein the second part of the headers from the plurality of frames that is not copied to the payload of the common frame includes synchronization information.

4. Apparatus for transferring information from a first sub-network to a second sub-network via a third sub-network in a transmission network, wherein information is transported between nodes in the transmission network in frames that each include a header and a payload, wherein a node generates a header for each frames transmitted from the node and wherein the node completely copies payload data from an incoming frames to one or more outgoing frames, wherein the payload data is allowed to float relative to frames, the apparatus comprising:
    means for copying a first part of a header into payload of a frame upon crossing a boundary between the first sub-network and the third sub-network such that available space is created in the payload by not copying a second part of the header therein;
    means for generating a reduced-size header to be used in the third sub-network that fits into the available space in the payload;
    means for adding timing information to the payload crossing the first boundary, the timing information indicating an extent to which frame duration in the first sub-network differs from the frame duration in the third sub-network; and
    means for using the timing information to regenerate frames in the second sub-network upon crossing the second boundary, so that frames in the second sub-network have substantially the same duration as corresponding frames in the first sub-network.

5. The apparatus according to claim 4, wherein headers and payload data from a plurality of frames carried by a first sub-network are multiplexed into a common outgoing frame, the common outgoing frame carrying an integer multiple of the information carried per incoming frame, wherein unoccupied space is created in the common outgoing frame by not copying a second part of the headers from the plurality of frames to payload of the common outgoing frame, and wherein the header of the common outgoing frame is maintained at a prescribed size so that a header of the common outgoing frame fits into the unoccupied space.

6. The apparatus according to claim 5, wherein the second part of the headers from the plurality of frames that is not copied into the payload of the common outgoing frame includes synchronization information.

7. A system for transporting information from a first sub-network to a second sub-network via a third sub-network in a transmission network, wherein information is transported between nodes in the transmission network in frames, each of the frames including a header and a payload, wherein a node generates a header for each frame transmitted from the node and wherein the node completely copies payload data from an incoming frame to one or more outgoing frames, and wherein the payload data is allowed to float relative to frames, the system comprising:
    in the first sub-network, a means for copying a first part of a header into payload of a frame for transmission across a first boundary between the first sub-network and the third sub-network, wherein available space is created in the payload by not copying a second part of the header therein, and wherein a reduced-size header is used in the third sub-network, the reduced-size header having a prescribed size that fits into the available space in the payload;

in the second sub-network, a means for retrieving the first part of the header and the reduced-size header from the payload and generating header information in the second sub-network;

one or more rate adapters in the first sub-network to add timing information to the payload when crossing the first boundary, the timing information indicating an extent to which a frame duration in the first sub-network differs from a frame duration in the third sub-network; and one or more rate adapters in the second sub-network for regenerating frames in the second sub-network, so that frames in the second sub-network have substantially the same duration as corresponding frames in the first sub-network.

8. The system according to claim 7, further comprising an interleaver for multiplexing headers and payload data from a plurality of frames carried by the first sub-network into a common frame carried by the third sub-network, the common frame carrying an integer multiple of information carried per frame in the first sub-network, wherein unoccupied space remains in the common frame by not copying a second part of the headers from the plurality of frames into payload of the common frame, wherein a header of the common frame is maintained at a prescribed size such that a header of an outgoing frame fits in the unoccupied space.

9. The system according to claim 8, wherein the second part of the headers from the plurality of frames that is not copied to the payload of the common frame includes synchronization information.

* * * * *